Nov. 21, 1939.  H. A. HENZE  2,180,588
MEASURING INSTRUMENT
Filed Jan. 15, 1936  2 Sheets-Sheet 1
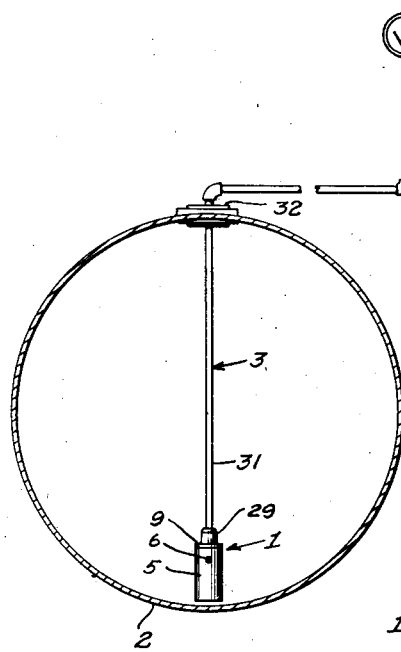
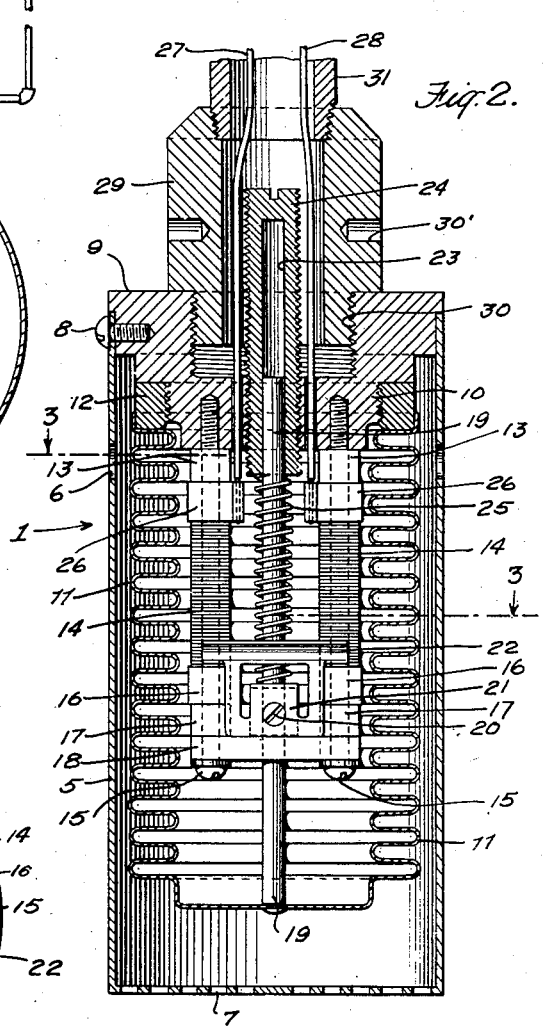
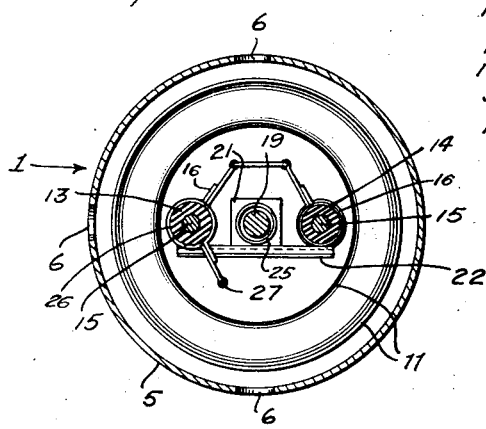
INVENTOR
HUBERT A. HENZE
BY
Moses & Nolte
his ATTORNEYS

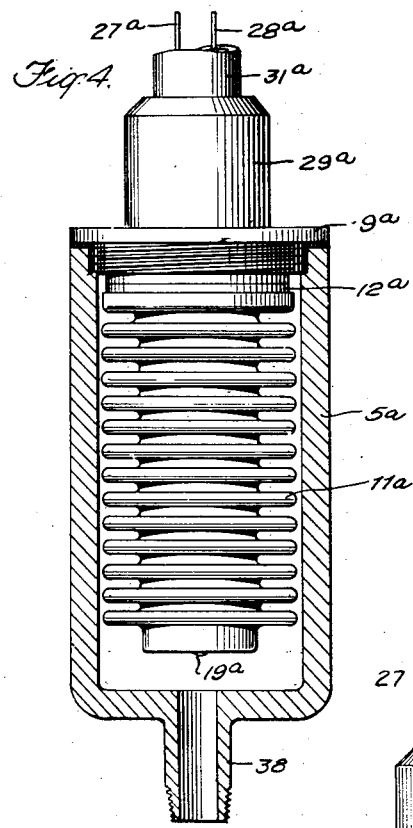
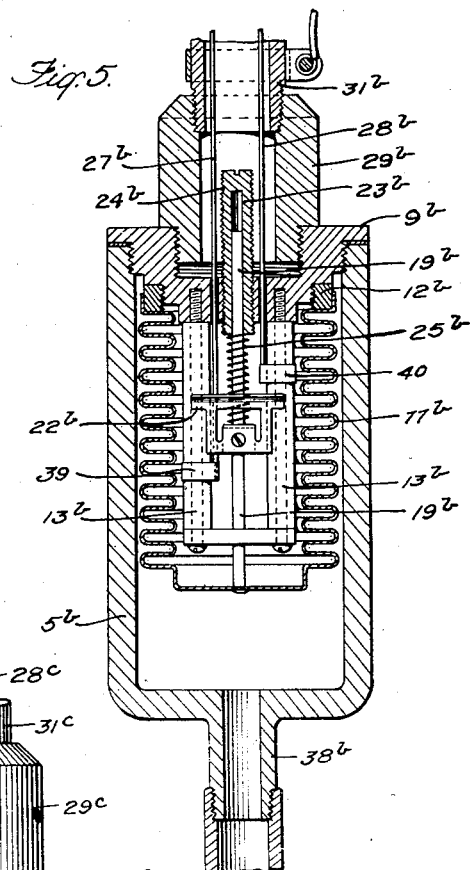
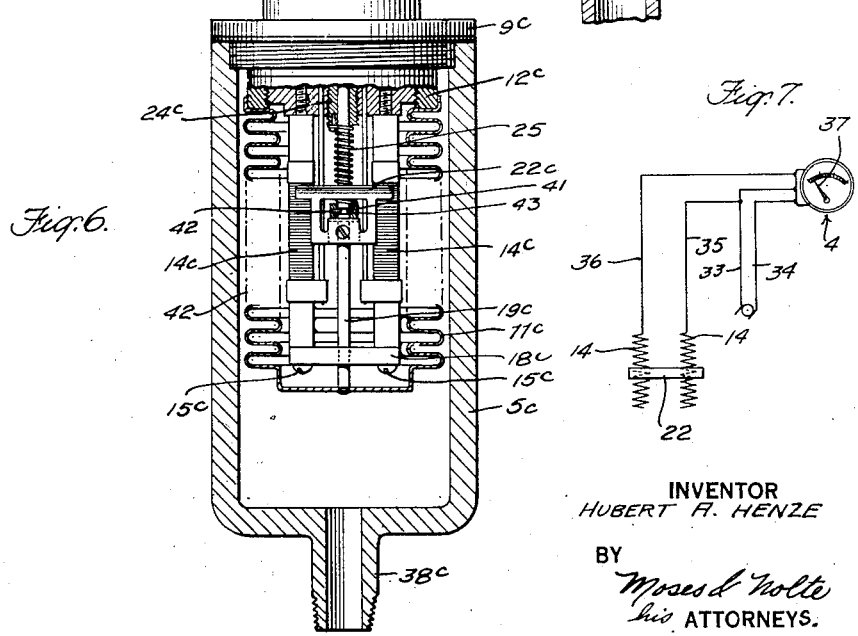
INVENTOR
HUBERT A. HENZE
BY
Moses & Nolte
his ATTORNEYS.

Patented Nov. 21, 1939

2,180,588

UNITED STATES PATENT OFFICE 2,180,588

MEASURING INSTRUMENT

Hubert A. Henze, Wood-Ridge, N. J.

Application January 15, 1936, Serial No. 59,192

2 Claims. (Cl. 201—48)

This invention relates to measuring instruments and more particularly to measuring instruments which are responsive to pressure. The invention may be embodied in a depth gauge, a pressure gauge, a vacuum gauge, or any other instrument in which the condition to be measured and indicated produces pressure or may be caused to produce pressure.

It is an object of the invention to provide a pressure responsive unit which is sensitive and accurate and which has a long range of movement, in combination with electrical means protected and directly actuated by the unit without the necessity of interposed gearing. It is a feature of the invention that the electrical means is in part housed and protected by the pressure responsive unit. It is not, however, necessary to house the electrical means within the pressure responsive unit. The electrical means may be mounted outside of the pressure responsive unit, but in an enclosure communicating with the interior of the unit and the motion of the pressure responsive unit may be transmitted to the electrical unit by means of a rod or other mechanical device.

In accordance with preferred embodiments of the invention the pressure responsive element is a flexible metallic bellows, and provision is made within the bellows of a rheostat or other electrical unit controlled by the bellows, and in turn controlling the impedance of an indicator circuit.

With such an arrangement not only is the electrical apparatus protected from contact with oil, water or other extraneous and harmful substances, but contact of oil or water is limited to the exterior of the bellows. The unit is made readily removable so that it can be taken out and cleaned from time to time and thereby maintained in a condition to operate sensitively and accurately over a prolonged period of use.

In every instance where the bellows may be exposed to a pressure greater than atmospheric pressure, it is important that the pressure be applied externally to the bellows. With such an arrangement, excessive pressure cannot burst the bellows but can only collapse it, so that no injury can result.

Other objects and advantages will hereinafter appear.

In the drawings forming part of this specification,

Fig. 1 is a view of a depth gauge embodying features of the invention installed in a tank;

Fig. 2 is a fragmentary vertical sectional view on a larger scale than Fig. 1 showing details of construction of the pressure responsive unit of Fig. 1;

Fig. 3 is a horizontal sectional view taken on the line 3—3 of Fig. 2 looking in the direction of the arrows;

Fig. 4 is a view in elevation of the pressure responsive unit of Fig. 2 with a different type of outer housing or shell applied to adapt the instrument to be employed as a pressure gauge;

Fig. 5 is a view similar to Fig. 2 illustrating a modified embodiment in which the instrument is used as a control device for maintaining pressure within pre-determined limits;

Fig. 6 is a view similar to Fig. 2 illustrating a further modified form of instrument adapted to be used as a vacuum gauge; and Fig. 7 is an electrical diagram illustrating a suitable wiring arrangement for the instrument of the figures other than Fig. 5.

In the embodiment of Figs. 1 to 3 and 7 a pressure responsive device 1 is desirably located in the bottom of a tank 2 containing liquid whose depth or volume is to be indicated. The tank may be either above the ground or buried since the instrument is adapted to be introduced through the top of the tank and to be located within the tank. A pipe line 3 is in sealed communication with the exterior of the device 1 and serves as a conduit for protecting electrical wires which lead from the device 1 to a source of current and to an indicating instrument 4. The instrument 4 is desirably of the type known as a differential volt meter and may be made like the instrument disclosed in United States Letters Patent to F. I. and B. P. Remy and A. Berger, No. 1,189,869, for Liquid gauge dated July 4, 1916.

The pressure responsive device 1 comprises an outer protective shell or housing 5 having perforations 6 and 7 through its sides and bottoms, respectively, to permit the free ingress and egress of liquid. The shell 5 is secured in any suitable manner as by screws 8 to a head block 9. The block 9 includes a threaded boss 10 to which a flexible metallic bellows 11 is detachably secured by means of a threaded ring 12. The block 9 has secured to its lower side a pair of blocks or cylinders 13 of insulating material upon which coils 14 of fine resistance wire are wound. Each block 13 surrounds the shank of a long screw 15 which is threaded into the boss 10 of the block 9. On the shank of each screw below the block 13 there are provided successively a metallic ring 16 and an insulating ring 17. The rings 16 are conductively connected to the coils 14 and to one another so that the circuit is never open. Thus there is never any possibility of arcing in case the sliding contact for any reason makes poor contact with one of the coils or leaves engagement with one of the coils. A metallic yoke 18 extends across to underlie both insulating rings 17 and to be impaled upon both screws 15. The yoke member 18 imparts rigidity and stability to the structure. It also serves as a guide for a stem 19 which is both riveted and soldered to the lower end of the bellows 11. Just above the yoke 18, the stem 19 has secured to it by a set screw 20 a carrier 21 for a bridging contact 22. The contact 22 is of resilient metal and is adapted to engage both of the coils 14 to connect the coils to one another at various points as the contact slides up and down along the coils. Increased external pressure applied to the bellows causes the stem 19 and the contact 22 to move upward while a reduction of external pressure permits the bellows to expand and to draw the contact 22 downward. The upper end of the stem 19 is guided in an axial bore 23 formed in a long screw 24 which is threaded through the boss 10 of the block 9. A compression coil spring 25 is interposed between the contact carrier 21 and the screw 24 and encircles the stem 19. Because of unavoidable irregularities in the manufacture of the bellows it is desirable to provide some adjustment for bringing the response of the pressure device into coordination with the scale of the indicating instrument 4. The adjustable nut 24 and the spring 25 serve this function. Thus, if the bellows as made is stiffer than the standard intended the screw 24 will be adjusted so as to apply a relatively slight pressure to the contact carrier 21, but if the bellows is more flexible and yielding than intended the screw 24 will be adjusted so as to apply a relatively great pressure of the spring 25 and thus compensate for the lack of resistance to compression of the bellows.

The upper end of each coil 14 is connected to a conductive collar 26 mounted on the associated block 13 and the collars are connected respectively to conductors 27 and 28. The conductors 27 and 28 extend upward through bores provided in the boss 10 and thence through a bored fitting 29. The fitting 29 is removably threaded in a threaded bore 30 in the upper portion of the block 9. When calibrating the instrument by means of the screw 24 the fitting 29 is desirably unthreaded from the block 9, the arrangement being such that the screw 24 may be conveniently made accessible. The fitting 29 is provided with diametrically opposed recesses 30' to enable the fitting to be turned by means of a spanner wrench. A pipe 31 extends upward from the fitting through a plug 32 in the top of a tank. The protective housing formed by the pipe 31 may be continued through any suitable series of pipes and fittings. The pipe or tubing communicating with it is open to the atmosphere at the exterior of the tank so that atmospheric pressure exists at all times within the bellows. The pipe serves as a vent for the interior of the bellows. Removal of the plug 32 from the top of the tank enables the entire instrument to be withdrawn.

A suitable electrical circuit of the instrument described is diagrammatically illustrated in Fig. 7. One terminal of a suitable source of current, such as an ordinary door bell transformer, is connected through a conductor 33 directly with the indicating instrument 4, the current traversing one of the two angularly related windings of the instrument and returning to the source through a conductor 34. A branch conductor 35 runs from the conductor 33 to one of the windings 14. The current passes thence across the bridging contact 22 to the other winding 14, flows to the instrument 4 through a conductor 36 and passes through the second of the angularly related coils of the instrument 4 to the conductor 34. As is well understood the coils of the instrument 4 act in opposed relation upon a common armature whereby the pointer 37 is carried. The position of the pointer is a function of the relative magnitudes of the electromagnetic force exerted by the instrument coils and not of the absolute values of such forces. The instrument is therefore independent of source variations of potential. Because of the fact, however, that the bridging contact 22 cuts out more or less turns of the rheostat coils 14 according to the degree of compression of the bellows, the impedance of the circuit including one of the coils is varied, while the impedance of the circuit including the other coil is constant. The position of the pointer is caused therefore to be a function of the pressure exerted upon the bellows.

The instrument as described has been found to be very simple and economical to manufacture and very accurate and efficient in use, being sensitively responsive to very slight changes of liquid level.

The embodiment of Fig. 4 is similar in all respects to the embodiment of Figs. 1 to 3 with the exception that a casing 5a of a construction somewhat different from the casing 5 is provided. This instrument is designed to be used as a pressure gauge. The casing 5a is accordingly made thick walled and imperforate so that it defines a pressure chamber around the bellows 11. The casing 5a is provided with a nipple 38 for attaching it to the exterior of a pressure conduit or tank. The instrument as thus constructed could also, if desired, be applied exteriorly to the lower portion of a liquid tank, such as the tank illustrated in Fig. 1.

With the exception of the change in the casing 5a the instrument of Fig. 4 is in all respects identical with the instrument of Figs. 1 to 3 and the same reference numerals have accordingly been applied with the subscript a added. The strength of the spring is chosen in accordance with the pressure range to be measured.

The instrument of Fig. 5 is generally the same as that of Fig. 4. The instrument has been modified, however, to adapt it to open an electrical circuit when a pre-determined pressure range is exceeded and to close the circuit when the pressure falls below such pre-determined range. In place of the resistance windings 14 of Fig. 2 provision is made upon the stems 13b of fixed lower and upper contacts 39 and 40 which control separate circuits. With the exception of the alteration of the electrical circuit and of the use made of the current supply, the instrument is unaltered and corresponding parts have therefore been given the same reference numerals as in Fig. 1 with the subscript b added. When the sliding contact 22b engages contact 39 a relay circuit is energized for closing a compressor motor circuit. The motor circuit remains closed until the sliding contact 22b engages the contact 40, whereupon a second relay circuit is energized to open the compressor motor circuit.

The motor controlling contacts as shown in

Fig. 5 may be employed in combination with a rheostat and indicating instrument if desired so that the pressure responsive mechanism serves both to give an indication to the attendant and to automatically control the pump motor.

In the form of the invention disclosed in Fig. 6 the arrangement is generally similar to that of Fig. 4. The instrument of Fig. 6, however, is adapted to act as a vacuum gauge, the sliding contact 22c being arranged to engage the upper ends of the coils 14c when the external and internal pressures are equal and to move downward along the coils as the vacuum in the casing 5c increases, that is to say, as the absolute pressure in the casing 5c diminishes. In this instance the spring 25c is a tension spring which is connected at its upper end to the bored screw 24c. Since rotation of the screw 24c involves a turning of the spring provision is made to permit the spring to be turned freely with the screw. The lower end of the spring 25c is accordingly connected to a collar 41 which encircles the rod 19c and which is provided with a radial pin 42 that extends into a circumferential groove 43 of the rod. The pin 42 and the groove 43 cause the collar 41 to move longitudinally in unison with the rod 19c, but permit the collar to turn freely relative to the rod 19c.

The parts are otherwise the same as in the embodiment of Fig. 4 and hence corresponding reference numerals have been applied with the subscript c added.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In a pressure responsive instrument, in combination, an elongated, circumferentially corrugated, cylindrical bellows, a fitting supporting one end of the bellows stationary, but permitting the opposite end to move in response to pressure variations, said fitting cooperating with the bellows to provide a chamber completely sealed against ingress of the surrounding medium, electrical impedance means supported from the fitting within the bellows, a stem within the bollows connected to the movable end of the bellows, a sliding contact carried by said stem, a plug threaded through the fitting, said plug containing an axial bore of slightly larger diameter than the stem and through which the stem slides, and a spring interposed between the plug and the sliding contact, said spring being adjustable by turning of the threaded plug.

2. In a pressure responsive device, in combination, a circumferentially corrugated, cylindrical bellows, a hollow fitting supporting one end of the bellows stationary but permitting the other end to move in response to pressure variations, said fitting cooperating with the bellows to provide a chamber completely sealed against ingress of the surrounding medium, a stem within the bellows connected to the movable end thereof, a plug screwed in the fitting having an axial bore of slightly greater diameter than the stems through which the stem slides, for guiding the stem against lateral movement, a compression spring surrounding the stem, one end of which abuts against the plug and the other end of which moves in accordance with the pressure induced movement of the bellows, tension of said spring being adjustable by turning the plug, and variable electrical impedance means, one member thereof being mounted in fixed relation to the fitting and a movable member thereof being mounted upon said stem in cooperative relation with said fixed member.

HUBERT A. HENZE.